US006375820B1

(12) United States Patent
Tomizaki et al.

(10) Patent No.: US 6,375,820 B1
(45) Date of Patent: Apr. 23, 2002

(54) METHOD FOR FORMING MULTI-LAYER PAINT FILM

(75) Inventors: Yasuhiro Tomizaki, Chigasaki; Akira Kasari, Hiratsuka; Takayoshi Hiraki, Odawara, all of (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 0 days.

(21) Appl. No.: 09/551,772

(22) Filed: Apr. 18, 2000

(30) Foreign Application Priority Data

Apr. 19, 1999 (JP) .......................................... 11-110616

(51) Int. Cl.$^7$ .......................... C09D 5/44; B32B 15/08; C08L 63/00

(52) U.S. Cl. ...................... 204/489; 204/487; 428/416; 523/415

(58) Field of Search ................................ 204/471, 484, 204/487, 489; 428/416; 523/415

(56) References Cited

U.S. PATENT DOCUMENTS 4,375,498 A * 3/1983 Le Minez et al. .......... 428/416
4,761,212 A * 8/1988 Wanatabe et al. ........ 204/181.1

* cited by examiner

*Primary Examiner*—Edna Wong
*Assistant Examiner*—Thao Tran
(74) *Attorney, Agent, or Firm*—Wenderoth, Lind & Ponack, L.L.P.

(57) ABSTRACT

The present invention provides a method for forming a multi-layer paint film, comprising: applying a cationic electrodeposition paint containing a block polyisocyanate compound as a cross-linking agent on a surface of a painted matter, applying a water based intermediate coat paint containing a block polyisocyanate compound as a cross-linking agent on an electrodeposition paint film surface without curing the electrodeposition paint film to form an intermediate coat paint film, and then heating to cure both of the electrodeposition paint film and the intermediate coat paint film at the same time to thereby form a multi-layer paint film.

21 Claims, No Drawings

METHOD FOR FORMING MULTI-LAYER PAINT FILM

The present invention relates to a method in which a cationic electrodeposition paint and a water based intermediate coat paint are applied by wet-on-wet and then heated to cross-link and cure both paint films at the same time, that is, coating is carried out by a so-called "2 coat 1 bake" system (2C1B) to form a multi-layer paint film, particularly to a method for forming a multi-layer paint film which is improved in a curing property, a chipping resistance, a corrosion resistance, a finishing appearance (smoothness, gloss feeling and the like) and an interlayer adhesive property between both paint films.

It is known to apply a cationic electrodeposition paint containing a block polyisocyanate compound as a cross-linking agent and a water based intermediate coat paint containing an amino resin as a cross-linking agent in order on a conductive coated article such as an outside plate of a car body by wet-on-wet and then heat and cure both paint films at the same time by heating to form a multi-layer paint film. However, this multi-layer paint film does not have a satisfactory finishing appearance such as smoothness, gloss feeling and the like, and it is difficult to solve this defect even by further applying a top coat paint. Further, automobiles using an outside plate on which such multi-layer paint film is formed have the problem that when small stones sent flying during running hit against such multi-layer paint film, chipping peeling is liable to be caused in a layer between both paint films.

An object of the present invention is to solve the problems described above in a method for applying a cationic electrodeposition paint and a water based intermediate coat paint by 2C1B to form a multi-layer paint film.

Intensive researches repeated by the present inventors have resulted in finding that the object described above can be achieved by using a block polyisocyanate compound as a cross-linking agent for both cationic electrodeposition paint and water based intermediate coat paint and adding a specific amount of a tin base catalyst to the cationic electrodeposition paint, and they have come to complete the present invention.

Thus, according to the present invention, provided is a method for forming a multi-layer paint film, comprising:

applying a cationic electrodeposition paint (A) containing a block polyisocyanate compound as a cross-linking agent on a surface of a substrate, applying a water based intermediate coat paint (B) containing a block polyisocyanate compound as a cross-linking agent on an electrodeposition paint film surface without curing the electrodeposition paint film to form an intermediate coat paint film, and then heating to cure both of the electrodeposition paint film and the intermediate coat paint film at the same time to thereby form a multi-layer paint film, wherein the above cationic electrodeposition paint (A) contains a tin base catalyst of at least 10 parts by weight per 100 parts by weight of the resin solid matter, and a cross-linking curing reaction in the electrodeposition paint film is controlled so that it starts earlier than a cross-linking curing reaction in the intermediate coat paint film.

In the present invention, a cross-linking curing-starting time in the paint films of the cationic electrodeposition paint (A) and the water based intermediate coat paint (B) can be determined by means of a pendulum type visco-elasticity measuring device (LEOVI-BRON DDV-OPA type, manufactured by Toyo Boldwin Co., Ltd.). To be specific, a pendulum having a weight of 22 g and an inertia moment of 850 g·cm$^2$ is used, and this pendulum is put on an uncured paint film of a paint applied on a steel plate so that the cured paint film has a film thickness of 30 $\mu$m. The above paint film is heated at a prescribed temperature (for example, 140 to 180° C.) for cross-linking and curing the paint film while vibrating the pendulum, and the time when a value of a logarithmic decrement of the pendulum starts going up is referred to as "cross-linking curing-starting time". In this case, the time spent from commencement of heating up to cross-linking curing-starting time is referred to as "curing-starting time", and the shorter time thereof means that "a cross-linking curing reaction starts earlier". The cross-linking curing-starting times of both paint films of the cationic electrodeposition paint (A) and the water based intermediate coat paint (B) are compared on the basis of results obtained by measuring at he same heating temperature.

The method of the present invention for forming a multi-layer paint film shall be explained below in further details.

Cationic electrodeposition paint (A):

The cationic electrodeposition paint (A) contains a block polyisocyanate compound as a cross-linking agent and further contains a tin base catalyst of at least 10 parts by weight per 100 parts by weight of the resin solid matter contained in the above paint. The cationic electrodeposition paint containing a base resin (A-1) having a hydroxyl group and a cationic group, a block polyisocyanate compound (A-2) and a tin base catalyst (A-3) can suitably be used.

The hydroxyl group contained in the base resin (A-1) takes part in a cross-linking reaction with the block polyisocyanate compound (A-2), and the cationic group takes part in the formation of a stable aqueous dispersion.

Such base resin (A-1) includes, for example, (1) reaction 30 products of epoxy resins with cationizing agents; (2) products obtained by protonating polycondensation products (refer to U.S. Pat. No. 2450940) of polycarboxylic acids and polyamines with acids; (3) products obtained by protonating polyaddition products of polyisocyanate compounds, polyols and mono- or polyamines with acids; (4) products obtained by protonating copolymers of acryl base or vinyl base monomers containing a hydroxyl group and an amino group with acids (refer to Japanese Patent Publication No. 12395/1970 and Japanese Patent Publication No. 12396/1970); and (5) products obtained by protonating adducts of polycarboxylic acids to alkyleneimines with acids (refer to U.S. Pat. No. 3403088).

Among them, particularly a base resin, which is included in the category (1), obtained by reacting a cationizing agent with an epoxy resin obtained by reacting a polyphenol compound with epichlorohydrin is preferred because of an excellent corrosion resistance thereof.

Capable of being used as the epoxy resin described above are conventionally known resins which have at least two epoxy groups in a molecule and which have a number average molecular weight falling in a range of 400 to 4000, preferably 800 to 2000 and an epoxy equivalent falling in a range of 190 to 2000, preferably 400 to 1000.

The polyphenol compound used for preparing the above epoxy resin includes, for example, bis(4-hydroxyphenyl)-2,2-propane, 4,4'-dihydroxybenzophenone, bis(4-hydroxyphenyl)-1,1 -ethane, bis(4-hydroxyphenyl)-1,1-isobutane, bis(4-hydroxy-tert-butyl-phenyl)-2,2-propane, bis(2-hydroxybutyl)methane, 1,5-dihydroxynaphthalene, bis(2,4-dihydroxyphenyl)methane, tetra(4-hydroxyphenyl)-1,1,2,2-ethane, 4,4'-dihydroxydiphenyl ether, 4,4'-dihydroxydiphenyl sulfone, phenol novolak and cresol novolak. Further, capable of being used as such epoxy resin are resins modified with polyhydric alcohols, polyether polyols, polyester polyols, polyamideamines, polycarboxylic acids and polyisocyanate compounds, and resins subjected to graft polymerization with acryl base monomers.

Capable of being used as the cationizing agent are, for example, amine compounds such as primary amines, secondary amines, tertiary amines and polyamines, and they are reacted with epoxy groups to introduce cationic groups such as a secondary amino group, a tertiary amino group and a quaternary ammonium base into the epoxy resins, whereby cationic group-containing resins can be prepared.

A hydroxyl group can be introduced into the cationic group-containing resin by a reaction with alkanolamines as a cationizing agent and a reaction with a ring-opening product of caprolactone which is sometimes introduced into an epoxy resin and polyols, or it includes a secondary hydroxyl group contained intrinsically in an epoxy resin. Among them, a primary hydroxyl group introduced by a reaction with alkanolamines as a cationizing agent is preferred because of an excellent cross-linking reactivity with a block polyisocyanate compound. Such alkanolamines include, for example, monoalkanolamines such as monoethanolamine, n-propanolamine and isopropanolamine; dialkanolamines such as diethanolamine, di-n-propanolamine and diisopropanolamine; N-alkylalkanolamines such as N-methylethanolamine and N-ethylethanolamine; trialkanolamines such as triethanolamine; N,N-dialkylalkanolamines such as N,N-dimethylethanolamine, N-methyldiethanolamine and N,N-di-ethylethanolamine; and N-alkyldialkanolamines such as N-methyl-diethanolamine and N-ethyldiethanolamine.

The base resin (A-1) has a hydroxyl group content falling in a range of 20 to 5000 mg KOH/g, particularly 60 to 3000 mg KOH/g in terms of a hydroxyl group equivalent and has particularly preferably a primary hydroxyl group equivalent falling in a range of 200 to 1000 mg KOH/g. Also, the cationic group is contained preferably in an amount in which the base resin can stably be dispersed in water, and it is present preferably in an amount falling in a range of usually 3 to 200, particularly 5 to 150 in terms of KOH (mg/g of solid matter) (amine value).

The base resin (A-1) does not preferably contain free epoxy groups in principle.

The block polyisocyanate compound (A-2) used as a cross-linking agent in the cationic electrodeposition paint (A) is obtained by reacting substantially all isocyanate groups of a polyisocyanate compound with a volatile active hydrogen-containing compound (blocking agent) to block them temporarily to thereby inactivate them at a room temperature. If this is heated at a prescribed temperature (dissociation temperature, for example, 100° C. or higher), the blocking agent is dissociated, and the free isocyanate groups are regenerated and take part in a cross-linking reaction with the base resin (A-1).

The polyisocyanate compound is a compound having at least two isocyanate groups in a molecule, and conventionally known aliphatic, alicyclic and aromatic polyisocyanate compounds can be used and include, for example, tolylenediisocyanate, xyhilenediisocyanate, phenylenediisocyanate, bis(isocyanatemethyl)cyclohexane, tetramethylenediisocyanate, hexamethylenediisocyanate, methylenediisocyanate and isophoronediisocyanate, or terminal isocyanate group-containing prepolymers obtained by reacting excess amounts of these polyisocyanate compounds with low molecular active hydrogen-containing compounds such as ethylene glycol, propylene glycol, trimethylolpropane, hexanetriol and castor oil. Also, conventionally known products can be used for the blocking agent and include, for example, phenol base compounds such as phenol, p-t-butylphenol and cresol; aliphatic alcohols such as n-butanol and 2-ethylhexanol; aromatic alcohol base compounds such as phenylcarbitol and methylphenylcarbitol; ether alcohol base compounds such as ethylene glycol monobutyl ether; lactam base compounds such as ε-caprolactam and γ-butyrolactam; oxime base compounds such as methyl ethyl ketoxime and cyclohexanoneoxime; and other blocking agents of an active methylene base, a mercaptan base, an acid amide base, an imide base, an amine base, an imidazole base, a urea base, a carbamic acid base, an imine base and a sulfurous acid base. Among them, the lactam base and oxime base blocking agents are dissociated at a relatively low temperature and therefore suited from a viewpoint of a curability of the electrodeposition paint at a low temperature.

A mixing proportion of the base resin (A-1) to the block polyisocyanate compound (A-2) in the cationic electrodeposition paint (A) shall not specifically be restricted. In general, the base resin (A-1) accounts preferably for 40 to 90%, particularly 50 to 80% based on the total solid matter weight of both components, and the block polyisocyanate compound (A-2) accounts preferably for 60 to 10%, particularly 50 to 20%.

The tin base catalyst (A-3) is to accelerate a reduced-to-urethane cross-linking reaction of the base resin (A-1) with the block polyisocyanate compound (A-2) and includes, for example, organic tin compounds such as tin octoate, dibutyltin dilaurate, dibutyltin-bis-o-phenylphenylene, dibutyltin-s,s-dibutyldithio-carbonate, dibutyltin maleate, dibutyltin diacetate, dibutyltin dilaurate mercaptide and dimethyltin dichloride. A blending amount of the tin base catalyst (A-3) can usually fall in a range of at least 10 parts by weight, preferably 11 to 30 parts by weight and particularly preferably 11 to 20 parts by weight per 100 parts by weight of the total solid matter of the base resin (A-1) and the block polyisocyanate compound (A-2).

The cationic electrodeposition paint (A) can be prepared by neutralizing the cationic groups contained in the base resin (A-1) with an acidic compound such as acetic acid, formic acid lactic acid and phosphoric acid and mixing and dispersing together with the block polyisocyanate compound (A-2) and the curing catalyst (A-3) in an aqueous medium. The resulting aqueous solution has a pH falling suitably in a range of 3 to 9, particularly 5 to 7 and a solid content falling suitably in a range of 5 to 30% by weight. The cationic electrodeposition paint (A) can suitably be compounded, if necessary, with an extender pigment, a color pigment, a rust-preventive pigment, a precipitation preventive and the like.

The cationic electrodeposition paint (A) used in the present invention is blended with a bismuth compound (A-4) in addition to the base resin (A-1), the block polyisocyanate compound (A-2) and the tin base catalyst (A-3), whereby the paint film can be improved in a curability and a corrosion resistance without using lead-containing compounds which are regarded as problematic in terms of environmental sanitation, and therefore it is more preferred.

Oxides and hydroxides of bismuth and salts thereof with inorganic or organic acids are included in the bismuth compound (A-4) and include, for example, bismuth oxide, bismuth hydroxide, bismuth trioxide, bismuth nitrate, bismuth benzoate, bismuth citrate, bismuth oxycarbonate, basic bismuth carbonate and bismuth silicate. Among them, bismuth hydroxide is suited. A blending amount of these bismuth compounds falls suitably in a range of usually 0.1 to 10 parts by weight, particularly 0.2 to 5 parts by weight per 100 parts by weight of the total solid matter of the base resin (A-1) and the block polyisocyanate compound (A-2).

Further, capable of being used as well for the bismuth compound (A-4) is "an aqueous dispersion paste of bismuth" obtained by mixing and dispersing a water-insoluble bismuth compound as the bismuth-containing compound (A-4) and an aliphatic carboxylic acid shown by the following formula (I) in an aqueous medium:

$$R^1—CH(O—R^2)—(CH_2)_n—COOH \qquad (I)$$

wherein $R^1$ represents a hydrogen atom or an alkyl group having 1 to 3 carbon atoms; $R^2$ represents a hydrogen atom or an alkyl group having 1 to 10 carbon atoms; and n represents 0 or 1.

The "aqueous dispersion paste of bismuth" resides in a state that the resulting aliphatic carboxylic acid-modified bismuth compound is dispersed uniformly and stably in water in a non-water soluble condition, and if this is added to the electrodeposition paint (A), the electrodeposition paint film can further be improved in a curability and a corrosion resistance without reducing a throwing power and a finishing property of the paint film.

The water-insoluble bismuth compound used for preparing the aqueous dispersion paste of bismuth includes, for example, bismuth oxide, bismuth hydroxide and basic bismuth carbonate which have a solubility of 0.001 g or less to 100 g of water at 20° C. Among them, bismuth oxide is suited.

The aliphatic carboxylic acid represented by the formula (I) described above is used in order to turn the water-insoluble bismuth compound into a homogeneous aqueous dispersion and includes, for example, aliphatic hydroxycarboxylic acids such as hydroxyacetic acid, lactic acid and hydroxypropionic acid; and aliphatic alkoxycarboxylic acids such as methoxyacetic acid, ethoxyacetic acid and 3-methoxypropionic acid. Among them, lactic acid, particularly L-lactic acid and methoxyacetic acid are suited. Further, these aliphatic carboxylic acids may be used in combination with other organic acids such as acetic acid. A use amount of the aliphatic carboxylic acid is optional as far as it falls in a range where the resulting aliphatic carboxylic acid-modified bismuth compound can be in a water-insoluble state. It is variable depending on the kind of the aliphatic carboxylic acid and falls preferably in a range of 0.5 to 1.7, particularly 0.75 to 1.3 in terms of a mole ratio based on the amount of bismuth in the water-insoluble bismuth compound, for example, in the case of L-lactic acid and falls preferably in a range of 0.25 to 2.5, particularly 0.5 to 1.3 in the case of methoxyacetic acid.

In mixing and dispersing the water-insoluble bismuth compound and the aliphatic carboxylic acid in an aqueous medium, a dispersant can be used in combination, and the base resin (A-1) and surfactants can be used as such dispersant. The surfactants include anionic type surfactants of an acetylene glycol base, a polyethylene glycol base and a polyhydric alcohol base each having an HLB of 3 to 18. A use amount of these dispersants falls preferably in a range of 10 usually 1 to 150 parts by weight, particularly 10 to 100 parts by weight per 100 parts by weight of the water-insoluble bismuth compound.

The "aqueous dispersion paste of bismuth" is produced, for example, by adding the aliphatic carboxylic acid and the water-insoluble bismuth compound to an aqueous medium containing, if necessary, a dispersant and subjecting them to dispersion treatment in a disperse-mixing equipment such as a ball mill and a sand mill. The paste thus obtained can have a solid matter concentration of usually 10 to 70% by weight, preferably 30 to 60% by weight. A blending ratio of the dispersion paste of bismuth to the cationic electrodeposition paint (A) can fall in a range of usually 0.1 to 10 parts by weight, preferably 0.5 to 5 parts by weight per 100 parts by weight of the total solid matter of the base resin (A-1) and the block polyisocyanate compound (A-2).

Pigments which are usually used for an electrodeposition paint can be used as a pigment which can be blended with the cationic electrodeposition paint (A) and include, for example, color pigments such as titanium oxide, carbon black and red iron oxide; extender pigments such as clay, mica, baryta, talc, calcium carbonate and silica; and rust-preventive pigments such as aluminum phosphomolybdate and aluminum tripolyphosphate.

In the present invention, a cross-linking curing reaction in the paint film of the cationic electrodeposition paint (A) has to start earlier than that in the paint film of the intermediate coat paint (B) adjacent thereto at an upper layer. In order to do 80, a curing-starting temperature of the paint film of the cationic electrodeposition paint (A) is preferably set to a lower temperature than that of the paint film of the intermediate coat paint (B), and a difference in a curing temperature between both paint films falls preferably in a range of 5 to 20° C., particularly 5 to 15° C. If a cross-linking curing reaction in the paint film of the cationic electrodeposition paint (A) starts later than that of the paint film of the intermediate coat paint (B), it usually becomes difficult to improve a finishing appearance (smoothness, gloss feeling and the like) of the multi-layer paint film formed and an interlayer adhesive property between both paint films. A commencement of a cross-linking curing reaction in the paint film of the cationic electrodeposition paint (A) can readily be controlled, for example, by suitably selecting the kinds and the blending amounts of the polyisocyanate compound, the blocking agent and the curing catalyst. In the paint film of the cationic electrodeposition paint (A), the "curing-starting time" spent from starting heating up to the cross-linking curing-starting time falls suitably in a range of 5 to 15 minutes in the coating step.

The cationic electrodeposition paint (A) can be applied at a bath temperature of 20 to 35° C., a voltage of 100 to 400 V and a current applying time of 1 to 10 minutes with a substrate used as a cathode and a carbon plate used as an anode. The paint film thickness can be about 10 to about 40 μm, preferably about 15 to about 30 μm. The substrate includes, for example, a base material having a conductive metal surface, particularly a car body and electric products.

According to the present invention, the cationic electro-base monomer on a normal condition and has preferably a number average molecular weight falling in a range of 1000 to 50000, particularly 2000 to 20000, a hydroxyl group value falling in a range of 20 to 200 mg KOH/g, particularly 50 to 150 mg KOH/g and an acid value falling in a range of 100 mg KOH/g or less, particularly 20 to 70 mg KOH/g.

The block polyisocyanate compound (B-2) is a cross-linking agent for the base resin (B-1), and to be specific, capable of being used is at least one suitably selected from those given as the examples of the block polyisocyanate compound (A-2) which has been explained as the cross-linking agent in the cationic electrodeposition paint (A) described above.

A mixing ratio of the base resin (B-1) to the block polyisocyanate compound (B-2) in the water based intermediate coat paint (B) shall not specifically be restricted. In general, the base resin (B-1) accounts preferably for 40 to 90%, particularly 50 to 80% based on the total solid matter weight of both components, and the block polyisocyanate compound(B-2) accounts preferably for 60 to 10%, particularly 50 to 20%.

The water based intermediate coat paint (B) can further contain an extender pigment, a color pigment, a surface-controlling agent and the like in addition to the base resin (B-1) and the block polyisocyanate compound (B-2).

In the present invention, a crosslinking curing-starting time in the paint film of the water based intermediate coat paint (B) is set so that it is delayed as compared with a crosslinking curing-starting time in the paint film of the cationic electrodeposition paint (A) which is adjacent thereto at a lower layer. To be specific, the paint film of the water based intermediate coat paint (B) preferably starts a cross-linking curing reaction later by 0.5 to 10 minutes, particularly 5 to 10 minutes than a starting time of a cross-linking deposition paint (A) is applied, and then the water based intermediate coat paint (B) containing a block polyisocyanate compound as a cross-linking agent is applied on the painted surface thereof without curing the paint film.

Water based intermediate coat paint (B):

The water based intermediate coat paint (B) used in the present invention is a water based liquid paint containing a block polyisocyanate compound as a cross-linking agent, which is applied on the uncured electrodeposition paint film surface described above, and is preferably a water based paint which contains a base resin (B-1) having a functional group such as a hydroxyl group capable of crosslink-reacting with an isocyanate group and a block polyisocyanate compound (B-2) and which is prepared by mixing and dispersing them in an aqueous medium. The paint film thereof starts a cross-linking curing reaction later than the paint film of the electrodeposition paint (A) adjacent thereto at a lower layer.

For example, polyester resins and acryl resins having at least two hydroxyl groups in a molecule can preferably be used as the base resin (B-1).

A hydroxyl group-containing polyester resin can be prepared, for example, by subjecting a polybasic acid and polyhydric alcohol to esterification reaction under a condition of an excess in a hydroxyl group by a conventionally known method and has preferably a number average molecular weight falling in a range of 1000 to 50000, particularly 2000 to 20000, a hydroxyl group value falling in a range of 20 to 200 mg KOH/g, particularly 50 to 150 mg KOH/g and an acid value falling in a range of 100 mg KOH/g or less, particularly 10 to 70 mg KOH/g.

A hydroxyl group-containing acryl resin can be prepared by copolymerizing a hydroxyl group-containing polymerizable monomer with a polymerizable monomer component containing an acryl curing reaction in the paint film of the cationic electrodeposition paint (A). That is, "a curing-starting time" spent from starting heating of the paint film of the water based intermediate coat paint (B) up to the cross-linking curing-starting time is longer as compared with "a curing-starting time" of the paint film of the cationic electrodeposition paint (A), and a difference therebetween falls suitably in a range of 0.5 to 10 minutes, particularly 5 to 10 minutes.

A crosslinking curing-starting time in the paint film of the water based intermediate coat paint (B) can readily be controlled, for example, by suitably selecting the kinds and the blending amounts of the polyisocyanate compound and the blocking agent. A starting time of a cross-linking curing reaction in the paint film of the water based intermediate coat paint (B) is later as compared with a starting time of a cross-linking curing reaction in the paint film of the cationic electrodeposition paint (A), and to be specific, a difference therebetween in the coating step falls suitably in a range of 5.5 to 20 minutes, particularly 10 to 15 minutes.

The water based intermediate coat paint (B) is obtained by mixing and dispersing the base resin (B-1) and the block polyisocyanate compound (B-2) homogeneously in an aqueous medium.

The solid matter concentration in coating is preferably controlled in a range of usually 10 to 70% by weight, particularly 15 to 40% by weight.

In the method of the present invention, the cationic electrodeposition paint (A) is applied and, if necessary, after drying it at a low temperature of 120° C. or lower without curing the paint film, the water based intermediate coat paint (B) is applied on this electrodeposition paint film surface. The water based intermediate coat paint (B) can be applied by means of electrostatic coating, airless spray and air spray, and the film thickness thereof falls suitably in a range of about 5 to about 80 μm, particularly about 15 to about 35 μm in terms of a cured paint film thickness.

As described above, the cationic electrodeposition paint (A) is applied, and the water based intermediate coat paint (B) is applied on this uncured electrodeposition paint film surface without curing this paint film. Then, they are heated at a temperature of not lower than a dissociation temperature of the block polyisocyanate compound contained in both paint films, for example, a temperature of about 100 to about 180° C., preferably about 140 to about 170° C. and baked at this temperature for 10 to 40 minutes, whereby both paint films can be cured almost at the same time, and this enables to form a multi-layer paint film.

The method of the present invention is characterized by adding a specific amount of the tin base catalyst to the cationic electrodeposition paint in applying the cationic electrodeposition paint and the water based intermediate coat paint to form a multi-layer paint film by 2C1B, and the paint film of the cationic electrodeposition paint containing a specific amount of this tin base catalyst starts cross-linking and curing earlier as compared with the intermediate coat paint film containing no tin base catalyst. It is estimated that in addition thereto, after applying both of the cationic electrodeposition paint and the water based intermediate coat paint by wet-on-wet, the tin base catalyst contained in the electrodeposition paint film transfers and penetrates in order into the inside of the intermediate coat paint film adjacent at an upper layer during the heating step of both paint films to accelerate as well a cross-linking curing reaction in the intermediate coat paint film. As a result thereof, the electrodeposition paint film is first cross-linked and cured in the multi-layer paint film formed, followed by curing of the intermediate coat paint film. Both paint films have a good curability. Further, the electrodeposition paint film is improved in a corrosion resistance, and the intermediate coat paint film is improved in a chipping resistance, a smoothness and a gloss feeling. In addition thereto, it is considered that an interlayer adhesive property between both paint films can be improved still more.

A top coat paint such as a solid color paint, a metallic paint and a clear paint can be applied on the multi-layer paint film comprising the electrodeposition paint film and the intermediate coat paint film formed by the method of the present invention by a known method, for example, a 1 coat 1 bake system (1C1B), a 2 coat 1 bake system (2C1B), a 2 coat 2 bake system (2C2B) and a 3 coat 1 bake system (3C1B).

According to the present invention, a specific amount of the tin base catalyst is added to the cationic electrodeposition paint in applying the cationic electrodeposition paint and the water based intermediate coat paint by 2C1B to form the multi-layer paint film by 2C1B. The water based intermediate coat paint is applied on the uncured paint film surface of the cationic electrodeposition paint containing this tin base catalyst, whereby a curability of both paint films is elevated and further, a corrosion resistance of the electrodeposition paint film, a chipping resistance of the intermediate coat paint film, a smoothness and a gloss feeling of the intermediate coat paint film and an interlayer adhesive property between this electrodeposition paint film and the intermediate coat paint film can be improved still more.

The present invention shall more specifically be explained below with reference to examples and comparative examples. Both of parts and percentage are based on weight, and a film thickness of a coated film is that of a cured coated film.

A cross-linking curing-starting time in the paint films of the cationic electrodeposition paint and the water based intermediate coat paint was determined by means of a pendulum type visco-elasticity measuring device (Rheovibron DDV-OPA type, manufactured by Toyo Baldwin Co., Ltd.).

1. Preparation of Sample

1) Cationic electrodeposition paint (A)

a): Dissolved in 450 parts of butyl cellosolve was 1260 parts of a bisphenol A type epoxy resin ("EPIKOTE 1002", trade name, manufactured by Yuka Shell Co., Ltd.) having an epoxy equivalent of 630, and 132 parts of p-nonylphenol and 105 parts of N-methylethanolamine were added thereto. The temperature was elevated up to 140° C., and they were reacted at the same temperature to obtain an amine-added epoxy resin having a solid content of 77% and an amine value of 52. Added to 130 parts (solid matter: 100 parts) of this resin were 30 parts of a block polyisocyanate compound (curing agent) (remark 1) and 1.3 part of polypropylene glycol (number average molecular weight: 4000), and then 2.1 parts of acetic acid was added to solubilize them in water. Subsequently, 6.5 parts of a 20% lead acetate aqueous solution was added, and deionized water was further added gradually to disperse them, whereby an emulsion having a solid content of 30% was obtained.

On the other hand, 4.7 parts of the preceding amine-added epoxy resin having a solid content of 77% was neutralized with 0.16 part of a 88% formic acid aqueous solution, and then 22.2 parts of deionized water was added. Further, 15 parts of a titan white pigment, 7 parts of clay, 0.3 part of carbon black, 3.0 parts of basic lead silicate and 13 parts of dioctyltin oxide were added and dispersed by means of a ball mill to prepare a pigment paste having a solid content of 55%.

Then, the preceding emulsion having a solid content of 30% and the pigment paste having a solid content of 55% were mixed and diluted with deionized water to prepare a cationic electrodeposition paint (A-a) having a solid content of 19%.

(Remark 1) block polyisocyanate compound: produced by reacting 2-ethylhexyl alcohol monoether of ethylene glycol (blocking agent) with a reaction product of 174 parts of 2,6-tolylenediisocyanate with 85 parts of polycaprolactonediol having a hydroxyl group equivalent of 425.

b): A cationic electrodeposition paint (A-b) was prepared in the same manner as in the cationic electrodeposition paint (A-a), except that in the cationic electrodeposition paint (A-a), "6.5 parts of the 20% lead acetate aqueous solution" was cancelled, and "3.0 parts of bismuth hydroxide" was substituted for "3.0 parts of basic lead silicate" in the pigment paste having a solid content of 55%.

c): A cationic electrodeposition paint (A-c) was prepared in the same manner as in the cationic electrodeposition paint (A-a), except that in the cationic electrodeposition paint (A-a), "6.5 parts of the 20% lead acetate aqueous solution" was cancelled, and "one part of a dispersed paste of bismuth (in terms of a metal bismuth amount)" (remark 2) was substituted for "3.0 parts of basic lead silicate" in the pigment paste having a solid content of 55%.

(Remark 2) dispersed paste of bismuth: a bismuth-dispersed paste having a solid content of 50% prepared by charging a vessel with 133.3 parts of an epoxy base tertiary amine type pigment-dispersing resin (amine value: 100) having a solid content of 75% and 81.1 parts of methoxyacetic acid, dispersing them so that a homogeneous solution was obtained, then dropwise adding 233.5 parts of deionized water while stirring strongly and further adding 111.5 parts of bismuth oxide to mix and disperse them for 20 hours by means of a ball mill.

d): A cationic electrodeposition paint (A-d) (for a comparative example) was prepared in the same manner as in the cationic electrodeposition paint (A-a), except that "3 parts of dioctyltin oxide" was substituted for "13 parts of dioctyltin oxide" in the cationic electrodeposition paint (A-a).

2) Water based intermediate coat paint (B):

a): Mixed and dispersed in 1800 parts of deionized water were 1000 parts (solid matter amount) of a polyester resin (remark 3), 40 parts of dimethylaminoethanol ("AMINOALCOHOL 2Mabs", trade name, manufactured by Nihon Nyukazai Co., Ltd.), 410 parts of a block polyisocyanate compound (remark 4), 1400 parts of a titan white pigment ("TEYCA JR806", trade name, manufactured by Tayca Corp.) and 20 parts of carbon black ("MITSUBISHI CARBON BLACK M-100", trade name, manufactured by Mitsubishi Chemical Co., Ltd.) to obtain a water based intermediate coat paint (B-a).

(Remark 3) polyester resin: having a number average molecular weight of about 8000, an acid value of 20 mg KOH/g and a hydroxyl group value of 95 mg KOH/g, prepared by reacting 756 parts of neopentyl glycol, 109 parts of trimethylolpropane, 370 parts of hexahydrophthalic acid, 292 parts of adipic acid and 398 parts of isophthalic acid at 220° C. for 6 hours and then adding 45 parts of trimellitic anhydride to further continue the reaction at 170° C. for 30 minutes.

(Remark 4) block polyisocyanate compound: an aliphatic hexafunctional type block polyisocyanate compound prepared by blocking an adduct of a trimer of hexamethylenediisocanate with methyl ethyl ketoxime.

b): The water based intermediate coat paint (B-a) was further compounded with dioctyltin oxide of 12 parts per 100 parts of the total of the polyester resin and the block polyisocyanate compound to prepare a water based intermediate coat paint (B-b).

2. Examples and comparative examples

A dull steel plate having a size of 300 mm×200 mm×8 mm subjected to zinc phosphate treatment was immersed as a cathode in an electrodeposition bath of the cationic electrodeposition paint (A-a), (A-b) or (A-c) and subjected to application of electric current for electrodeposition (film thickness: 25 μm) at a bath temperature of 28° C. and a voltage of 200 V for 3 minutes. After washing with water, the steel plate was dried at 100° C. for 5 minutes, and the water based intermediate coat paint (B-a) or (B-b) was applied thereon (film thickness: 30 to 35 $\mu$m) by means of an air spray. After left standing at a room temperature for 5 minutes, it was heated at 170° C. for 30 minutes to cross-link and cure both paint films.

The multi-layer paint film thus obtained was subjected to a performance test. The test results are shown in Table 1.

| | Example | | | Comparative Example | |
|---|---|---|---|---|---|
| | 1 | 2 | 3 | 1 | 2 |
| Cationic electrodeposition paint | (A-a) | (A-b) | (A-c) | (A-d) | (A-d) |
| Curing-starting time: minute | 8 | 8 | 8 | 10 | 10 |
| Intermediate coat paint | (B-a) | (B-a) | (B-a) | (B-a) | (B-b) |
| Curing-starting time: minute | 12 | 12 | 12 | 12 | 7 |
| Gloss feeling | 95 | 95 | 95 | 92 | 65 |
| Distinct-of-image-gloss | 86 | 86 | 86 | 82 | 50 |
| Interlayer adhesive property | ○ | ○ | ○ | ○ | ○ |
| Chipping resistance | ◎ | ◎ | ◎ | ○ | Δ |
| Moisture resistance | ○ | ○ | ○ | ○ | ○ |
| Corrosion resistance | ○ | ○ | ○ | Δ | Δ |

The Test Methods are Shown Below

Gloss feeling: 600 specular reflectance (%)

Distinct-of-image-gloss:

The result was obtained by measuring by means of an image clarity measuring apparatus (IMAGE CLARITY METER, manufactured by Suga Test Instrument Co., Ltd.). The numerals in the table are ICM values, which fall in a range of 0 to 100%, and the larger the value is, the better the distinct-of-image-gloss (image clarity) is. The ICM value of 80 or more shows that the distinct-of-image-gloss is very good.

Interlayer adhesive property:

The multi-layer paint film was cut by means of a cutter so that the cutter reached the base to form 100 cross-cuts having a size of 1 mm×1 mm. A cellophane adhesive tape was adhered on the surface thereof and quickly peeled off at 20° C., and then the painted surface was observed. The mark ○ shows that the remaining number of the cross-cut paint films is 90 or more; the mark Δ shows that the remaining number of the cross-cut paint films is 89 to 85; and the mark X shows that the remaining number of the cross-cut paint films is 84 or less.

Chipping resistance:

Q-G-R Gravelo Meter (manufactured by Q-Panel Co., Ltd.) was used to blow 100 g of crushed stones having a diameter of 15 to 20 mm at an air pressure of about 4 kg/cm$^2$ and a blown angle of 90 degree to the painted surface at −20° C. and then, the painted surface condition was visually observed. The mark ◎ shows that few impact scratches are observed on the intermediate coat painted face of the multi-layer paint film; the mark ○ shows that a few impact scratches are observed on the intermediate coat painted face, but the electrodeposition paint film is not peeled at all; the mark Δ shows that pretty many impact scratches are observed on the intermediate coat painted face, and the electrodeposition paint film is peeled a little; and the mark X shows that a lot of impact scratches are observed on the intermediate coat painted face, and the electrodeposition paint film is peeled to a considerable extent. Moisture resistance:

The test plate was left standing on the conditions of 50° C. and a humidity of 95% for 72 hours, and then the appearance of the paint film was observed. Evaluation of the appearance: the mark ○ shows that no abnormality is observed; the mark Δ shows that a little blistering and peeling are observed; and the mark X shows that a lot of blistering and peeling are observed.

Brine-spraying resistance:

Evaluated according to JIS Z2371. The painted surface was crosscut by means of a cutter so that the cutter reached the base. The test time was 480 hours. The mark ○ shows that little production of rust is observed; the mark Δ shows that a little production of rust is observed; and the mark X shows that a lot of rust produced is observed.

What is claimed is:

1. A method for forming a multi-layer paint film, comprising:

applying a cationic electrodeposition paint (A) containing a block polyisocyanate compound as a cross-linking agent on a surface of a painted matter, applying a water based intermediate coat paint (B) containing a block polyisocyanate compound as a cross-linking agent on the electrodeposition paint film surface without curing the electrodeposition paint film to form an intermediate coat paint film, and then heating to cure both of the electrodeposition paint film and the intermediate coat paint film at the same time to thereby form a multi-layer paint film, wherein said cationic electrodeposition paint (A) contains a base resin (A-1) having a hydroxyl group and a cationic group, a block polyisocyanate compound (A-2), a tin base catalyst (A-3) of at least 10 parts by weight per 100 parts by weight of the resin solid content, and a bismuth-containing compound (A4) in a form of an aqueous dispersion paste of bismuth obtained by mixing and dispersing a water-insoluble bismuth compound and an aliphatic carboxylic acid shown by the following formula (I) in an aqueous medium:

$$R^1—CH(O—R^2)—(CH_2)_n—COOH \quad (I)$$

wherein $R^1$ represents a hydrogen atom or an alkyl group having 1 to 3 carbon atoms; $R^2$ represents a hydrogen atom or an alkyl group having 1 to 10 carbon atoms; and n represents 0 or 1, and a cross-linking curing reaction in the electrodeposition paint film is controlled so that it starts earlier than a cross-linking curing reaction in the intermediate coat paint film.

2. The method as described in claim 1, wherein the base resin (A-1) is obtained by reacting a cationizing agent with an epoxy resin obtained by reacting a polyphenol compound with epichlorohydrin.

3. The method as described in claim 2, wherein the epoxy resin has a number average molecular weight falling in a range of 400 to 4000 and an epoxy equivalent falling in a range of 190 to 2000.

4. The method as described in claim 2, wherein the cationizing agent is alkanolamine.

5. The method as described in claim 1, wherein the base resin (A-1) has a hydroxyl group equivalent falling in a range of 20 to 5000 mg KOH/g.

6. The method as described in claim 1, wherein the base resin (A-1) has an amine value falling in a range of 3 to 200 mg KOH/g of the solid matter.

7. The method as described in claim 1, wherein the block polyisocyanate compound (A-2) is a polyisocyanate compound blocked with an oxime base or lactam base blocking agent.

8. The method as described in claim 1, wherein the cationic electrodeposition paint (A) contains 40 to 90% of the base resin (A-1) and 60 to 10% of the block polyisocyanate compound (A-2) based on the total solid matter weight of the base resin (A-1) and the block polyisocyanate compound (A-2).

9. The method as described in claim 1, wherein the tin base catalyst (A-3) is selected from the group consisting of tin octoate, dibutyltin dilaurate, dibutyltin-bis-o-phenylphenylene, dibutyltin-s,s-dibutyldithio-carbonate, dibutyltin maleate, dibutyltin diacetate, dibutyltin dilaurate mercaptide and dimethyltin dichloride.

10. The method as described in claim 1, wherein the cationic electrodeposition paint (A) contains the tin base catalyst (A-3) in a range of 11 to 30 parts by weight per 100 parts by weight of the total solid matter of the base resin (A-1) and the block polyisocyanate compound (A-2).

11. The method as described in claim 1, wherein the cationic electrodeposition paint (A) contains the tin base catalyst (A-3) in a range of 11 to 20 parts by weight per 100 parts by weight of the total solid matter of the base resin (A-1) and the block polyisocyanate compound (A-2).

12. The method as described in claim 1, wherein the bismuth compound (A-4) is selected from the group consisting of bismuth oxide, bismuth hydroxide, bismuth trioxide, bismuth nitrate, bismuth benzoate, bismuth citrate, bismuth oxycarbonate, basic bismuth carbonate and bismuth silicate.

13. The method as described in claim 1, wherein the bismuth compound (A-4) is added in an amount falling in a range of 0.1 to 10 parts by weight per 100 parts by weight of the total solid matter of the base resin (A-1) and the block polyisocyanate compound (A-2).

14. The method as described in claim 1, wherein the water based intermediate coat paint (B) contains a base resin (B-1) having a functional group capable of crosslink-reacting with an isocyanate group and a block polyisocyanate compound (B-2).

15. The method as described in claim 14, wherein the base resin (B-1) is selected from the group consisting of a polyester resin having at least two hydroxyl groups in a molecule and an acryl resin having at least two hydroxyl groups in a molecule.

16. The method as described in claim 1, wherein the paint film of the water based intermediate coat paint (B) starts a cross-linking curing reaction later by 0.5 to 10 minutes than a starting time of a cross-linking curing reaction in the paint film of the cationic electrodeposition paint (A).

17. The method as described in claim 1, wherein the paint film of the water based intermediate coat paint (B) starts a cross-linking curing reaction later by 5 to 10 minutes than a starting time of a cross-linking curing reaction in the paint film of the cationic electrodeposition paint (A).

18. The method as described in claim 1, wherein a difference between a starting time of a cross-linking curing reaction in the paint film of the cationic electrodeposition paint (A) and a starting time of a cross-linking curing reaction in the paint film of the water based intermediate coat paint (B) is 5.5 to 20 minutes.

19. The method as described in claim 1, wherein a difference between a starting time of a cross-linking curing reaction in the paint film of the cationic electrodeposition paint (A) and a starting time of a cross-linking curing reaction in the paint film of the water based intermediate coat paint (B) is 10 to 15 minutes.

20. The method as described in claim 1, wherein both the electrodeposition paint film and the intermediate coat paint film are cured at the same time by heating at about 100 to about 180° C.

21. An article coated by the method as described in claim 1.

* * * * *